May 11, 1965  E. A. GALLO  3,182,681
PRESSURE CONTROL VALVE AND REGULATOR
Filed Feb. 23, 1962  2 Sheets-Sheet 2

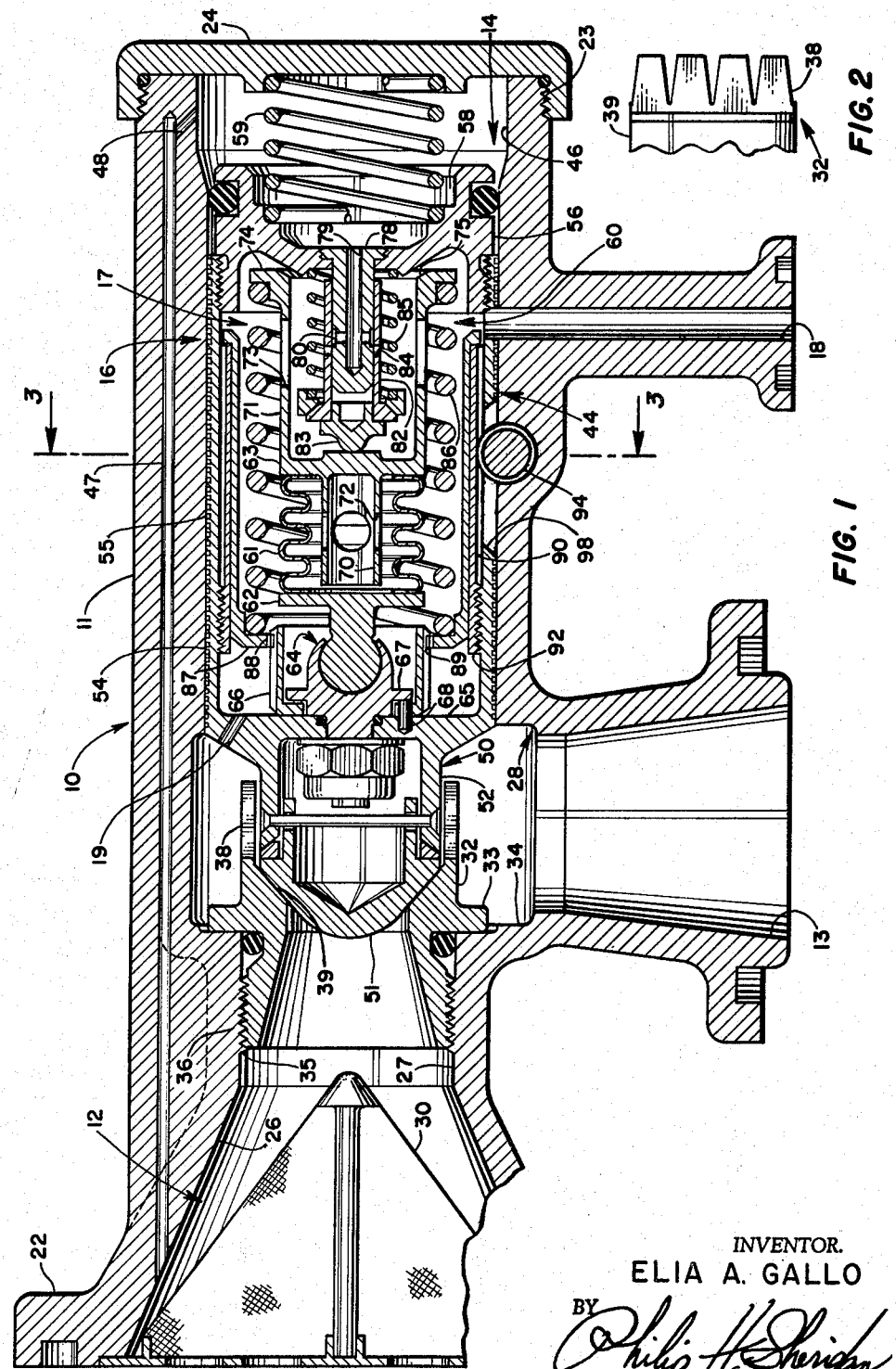

INVENTOR.
ELIA A. GALLO
BY
ATTORNEY

United States Patent Office 3,182,681
Patented May 11, 1965

3,182,681
PRESSURE CONTROL VALVE AND REGULATOR
Elia A. Gallo, Littleton, Colo., assignor to The Martin Marietta Corporation, Baltimore, Md., a corporation of Maryland
Filed Feb. 23, 1962, Ser. No. 175,000
5 Claims. (Cl. 137—468)

This invention relates to a novel and improved valve unit which is adaptable for use as a pressure regulator, pressure control or relief valve; more particularly, this invention relates to a combined pressure regulator and shut-off valve unit characterized by its reliability and sensitivity.

Many military and industrial applications require a valve unit which can perform different functions in controlling fluid flow and pressure without requiring replacement of the unit, or parts thereof, for each particular function. Thus, for example, it is desirable to have a unit which will act as a means of fluid pressure regulation, fluid control and pressure relief as required while affording maximum design simplicity, reliability and sensitivity to changes in flow and pressure. Moreover, in special applications where the fluid is subject to extreme changes in temperature, such as in the field of cryogenics, it is important that a unit of this type be extremely sensitive to pressure variations independently of temperature variations of the fluid. Easy interchangeability of moving parts is another factor to be considered from the standpoint of assembly, maintenance and servicing of the unit. Accordingly, it is a principal and foremost object of the present invention to fulfill the above requirements by devising a unit, greatly simplified in design, which is conformable for use as a means of pressure regulation, flow control and pressure relief.

It is another important object of this invention to provide a means of pressure regulation incorporating a minimum number of parts which are easily interchangeable and wherein the means of pressure regulation is extremely sensitive to pressure changes over a broad range of temperature conditions; and furthermore, where the unit can be easily assembled, installed, and subsequently modified without disassembly according to the particular application.

It is a further object to provide for a valve unit in which the valve and pressure sensing means are formed as one easily replaceable or interchangeable component for the purpose of flow control and pressure regulation; moreover, wherein the entire unit is greatly simplified in design and in such a way as to provide increased reliability and sensitivity independently of inlet pressure changes and temperature, and specifically wherein the sensing means can be accurately calibrated to maintain a selected constant pressure at the outlet side of the unit independently of temperature variations.

The above and other objects, advantages and features of the present invention will become more readily understood from the following detailed description of preferred and alternate forms thereof, taken together with the accompanying drawings, in which:

FIGURE 1 is a sectional view of a preferred embodiment of a pressure regulator, in accordance with the present invention;

FIGURE 2 is a developed fragmentary view of a portion of the valve seat;

Figure 3:
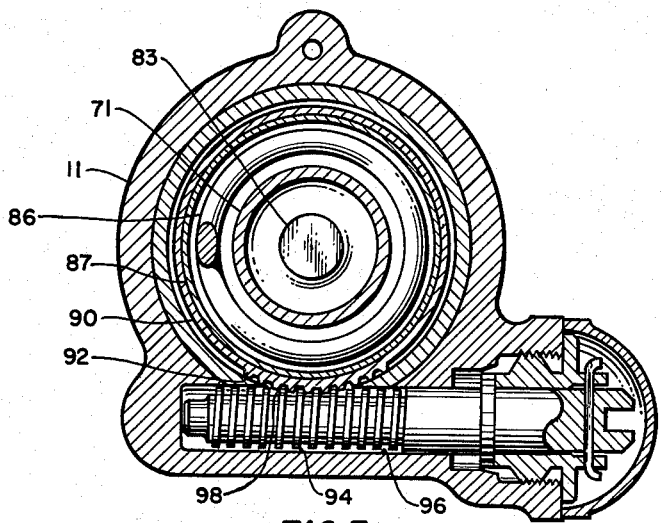
FIGURE 3 is a sectional view taken on line 3—3 of FIGURE 1.

Referring in detail to the drawings, a preferred form of pressure regulator 10 is shown in FIGURE 1 which is comprised of an outer, thick-walled body 11, of hollow cylindrical configuration, having an axial flow inlet 12 at one end and a transverse outlet 13 projecting outwardly from the wall of the body adjacent to the inlet end. The body itself forms an inner valve chamber 14 for disposition therein of a poppet valve assembly designated as 16 which houses a sensing unit 17.

In the form shown in FIGURE 1, the unit 10 acts as a means of establishing and maintaining a constant pressure at the outlet which is in communication with an outlet line or reservoir, not shown, where the pressure is to be held at a constant level. Accordingly, depending upon the particular connection to be made at the outlet, either a separate pressure-sensing port 18 may be positioned in the wall of the body 11 to communicate with the sensing units or an outlet pressure sensing orifice 19 may be provided in the body of the valve assembly at the inlet side, similarly for communication with the sensing unit.

Referring specifically to the construction and design of the regulator body 11, an outwardly projecting connection flange 22 is located at the inlet end for connection to some suitable source of supply of fluid under pressure and the opposite end of the body is externally threaded as at 23 for connection with a flat cover 24. The inlet 12 includes an inwardly convergent area 26 with its surface tapering into a throat area 27, the latter in turn communicating with an annulus 28 which is aligned with the outlet port 13. A filter element 30 is positioned across the convergent area 26 and a valve seat 32 of generally tubular configuration is positioned in the throat 27 having an external shoulder 33 abutting against side wall 34 of the body between the throat and annulus. It will be noted also that the throat is provided with spaced inwardly projecting ribs 35 to interengage with outwardly projecting ribs 36 of the valve seat in order to hold the seat against rotation within the body while permitting it to be easily inserted in place. A portion of the seat is shown in more detail in FIGURE 2 where, at the opposite end of the seat, a series of evenly spaced, tapered fingers 38 project forwardly from annular inclined seating surface 39 for a purpose to be described.

The major length of the regulator body from the annulus to the rear cover plate is in the form of a smooth inner surface portion defining the valve chamber 14 for insertion therein of the valve assembly 16. The assembly 16 is dimensioned in relation to the valve chamber so as to provide an enlarged clearance space 46 at the end of the valve chamber opposite the inlet, and an inlet flow passage 47 is channeled through the upper wall portion of the regulator body from the inlet to a bleed opening 48 leading into the clearance space or area 46. The valve assembly 16 is specifically comprised of a valve head 50 having a tapered nose 51 complementary to the seating surface 39 and a smooth exterior cylindrical surface portion 52 which is of a diameter slightly less than that of the tapered fingers portion 38 of the valve seat. A hollow piston 54 extends rearwardly from the valve head having an exterior, minutely grooved surface 55 dimensioned to slide in sealed, close fitting relation with the smooth inner surface of the valve chamber. This piston also serves as a housing for the sensing unit 17 and the end of the piston opposite the valve head is closed by an end cap 56 having an exterior recessed portion 58 for seated disposition of a spring 59. The spring extends between the end cap and the cover plate 24 to yieldably urge the end cap into abutting relation with the end of the valve piston, as well as to urge the entire valve assembly in a direction toward the valve seat. Briefly, from this relation, it will be seen that the inlet pressure bleeding through opening 48 into the clearance space 46 will act across a greater effective working area at the rear face of the end cap 56 than the effective area across the nose 51 of the valve head. Accordingly, the resultant force differential will be in a direction urging the valve head toward the closed position against the valve seat.

In order to establish a constant, selected pressure at the outlet, the sensing unit will regulate the pressure in the clearance space in relation to the pressure at the inlet to cause movement of the valve assembly to a position with respect to the valve seat whereby the pressure of fluid flow into the outlet will correspond with the selected outlet pressure. To accomplish this, the sensing unit is made up of a sensing chamber 60 within the valve piston and which communicates with outlet pressure either through port 18 or orifice 19, as desired. To sense the outlet pressure, a preferred arrangement consists of an evacuated bellows 61 positioned between an end plate 62 and shoulder portion 63. The end plate 62 actually forms an extension from the male end of a flexible joint 64, the joint being securely connected to the forward, closed end wall 65 of the piston 54 and which is surrounded by a splined tubular retainer element 66. The latter element is held against the wall of the piston by an annular ridge 67 of the flexible joint and is further held against rotation by a pin 68 projecting from a blind hole in wall 65 through an opening in the retainer. The opposite shoulder 63 actually forms an intermediate wall between the bellows support tube 70 and a coaxial, enlarged spring support tube 71. The bellows support tube is provided with a number of openings 72 and this tube merely acts to support the bellows against complete collapse when in the evacuated condition. The spring support tube 71 is similarly provided with openings 73 to permit free flow of fluid within the tubular element and has an external shoulder 74 at its rearward end to support a spring element in a manner to be described, together with an inclined surface 75 which will abut against the end cap 56 at one extreme limit of travel of the sensing unit.

Extending between the shoulder 63 and end cap 56 within the tube 71 is a flow control unit which regulates the pressure in the clearance space 46 in accordance with the pressure to be maintained at the outlet. This flow control unit acts as a follower with respect to the movement of the pressure sensing means, or bellows, and includes a stem 78 projecting forwardly from the center of the end cap and which has a central longitudinal opening 79 and lateral bores 80. Surrounding the stem is a sleeve 82 mounted for slidable movement thereon and which has an abutment element 83 contacting the central part of the shoulder or end plate 63; openings 84 are normally aligned with the openings 80 in the stem when the sleeve 82 is at its rearward-most position abutting against the end cap 56. In aligned relation, the openings 80 and 84 will provide a variable flow orifice for communication between the sensing chamber and the clearance space, which orifice is of a size greater than the size of bleed opening 48 to permit increased flow of fluid between the sensing chamber and clearance space when required. In order that the flow control unit will follow movement of the bellows in either direction, a spring 85 is mounted in surrounding relation to the sleeve between the end cap and end of the sleeve so as to constantly bias the unit against the end plate 63. The bellows will of course tend to expand or contract in accordance with varying pressure conditions in the sensing unit, as will be described more in detail. It is important to note, though, that the outlet pressure in the sensing chamber will exert a greater force in a direction urging th bellows to contract, as it will act across a greater effective area across the rear surface of plate 63.

Calibrating means is positioned in surrounding relation to the bellows and flow control unit and which is manually adjustable to effect movement of the valve assembly in relation to the valve seat to obtain the desired pressure level at the outlet. The calibrating means is therefore defined by a calibrating spring 86 in spaced outer concentric relation to the bellows and spring support tube 71, one end of the spring abutting the shoulder 74 and the opposite end abutting against a movable support element 87. The latter has an inwardly projecting annular wall 88 with a splined inner edge surface 89 complementary to the splined exterior surface of the retainer 66. Interengagement between the splined edges will prevent rotation of the support element 87 and spring 86 while permitting them to slide freely in a lengthwise direction in relation to the retainer and the pressure sensing means. A temperature compensating element 90 of tubular configuration abuts against member 87 at one end and is connected at the opposite end 91 to the inner surface of the piston. Its exterior surface is formed with gear teeth 92 for engagement of a transverse, manual adjusting screw 94, and this relationship is best seen from FIGURE 3. Actually, the screw projects through a transverse opening 96 in the regulator body and a recess 98 on the lower side of the valve piston for limited engagement with the gear 92 whereby to advance or retract the entire spring supporting element. Movement of the spring support, for example, to the right will cause increased tensioning of the spring 86 so as to exert an increased stretching or expansive force on the bellows. As a result of bellows expansion, the nozzle or sleeve will similarly move under the urging of the bellows and in a direction to increase the flow area of the orifice openings 80 and 84. Conversely, this flow area will be reduced when the spring is compressed causing contraction of the bellows and movement of the sleeve in a direction away from the clearance space. In aligned relation, the flow area through orifices 80 and 84 is larger than the bleed opening 48 so that increases in flow area due to expansion of the bellows will cause a decrease in pressure in the clearance space; decreases in flow area due to contraction of the bellows will correspondingly increase the pressure in the clearance space.

Based on this relation, it will be apparent that in order to increase the outlet pressure, the screw 94 is manipulated to advance the spring supporting element to the right, as viewed in FIGURE 1, so as to increase the tensioning of the spring and cause a movement of the bellows and flow control unit to the right thereby to increase the flow area through orifice 80. This will cause the fluid in the clearance space to bleed more rapidly through the orifice thereby decreasing the pressure in the fluid space and permitting a movement of the valve assembly to the right thereby increasing the flow opening into the outlet. Retraction of the spring supporting element to reduce the tensioning of the spring and to restrict the flow orifice opening will of course cause a corresponding reduction in pressure at the outlet. The same would apply to maintaining a desired constant pressure level condition at the outlet. Once the constant pressure is established through suitable calibration by means of the adjusting screw 94, any variation in pressure will be resisted by the sensing unit in the following manner: Due to the greater effective area across the bellows end plate 63 as hereinbefore mentioned, under a pressure increase, the bellows will be contracted causing a movement of the sleeve 82 to the left and a restriction of the orifice 80. This will cause an increase in pressure in the clearance space 46 forcing the valve assembly to the left and reducing the pressure of fluid flow past the valve head. Conversely, reduction in pressure across the end plate 63 will permit the bellows to expand, increase the orifice flow area and reduce the pressure in the clearance space to permit the valve assembly to move to the right. Thus, the flow area past the valve head will be gradually increased until equilibrium is again reestablished in the sensing unit which, in turn, will control the reference pressure value in the clearance space 46 to the one required to hold the valve assembly at its new position.

A number of advantages are attained through this construction and arrangement. One notable advantage is the self-dampening action of the sensing unit. For example, any sudden motion of the valve assembly will be opposed by the sensing unit mass and due to the inertia force will lag and by minutely changing the flow area of restriction through the orifice 80 will affect the value of pressure in the clearance space to react against the motion of the valve assembly. This "slowing" characteristic would show the valve response parameter to be a series of blending step functions instead of a straight line.

Another feature resides in the use of a temperature compensating element which by being affixed to the valve piston will tend to oppose any expansion or contraction of the calibrating spring 86 due to temperature variations. For example, a decrease in temperature tending to cause contraction of the spring would cause similar contraction in the temperature compensating element 90 and in a direction opposite to the direction of contraction of the spring. By selecting materials of suitable composition for the spring and temperature compensating element, the thermal differential expansion constant of the spring 86 and element 90 may be so related as to exactly oppose one another and make the valve accurately sensitive, apart from any temperature variations. This is a particular advantage where working under extremes of temperature variations such as in the cryogenics field.

Another important feature resides in the particular disposition and arrangement of the valve assembly in relation to the inlet and outlet. Here, the coaxial relationship of the various elements, such as, the valve assembly, valve head and valve seat, as well as the elements comprising the valve assembly, makes the entire unit easy to maintain, and the parts can be easily interchanged and serviced. This coaxial relationship also greatly simplifies the entire design and makes the unit adaptable for use in a number of different applications.

Figure 4:
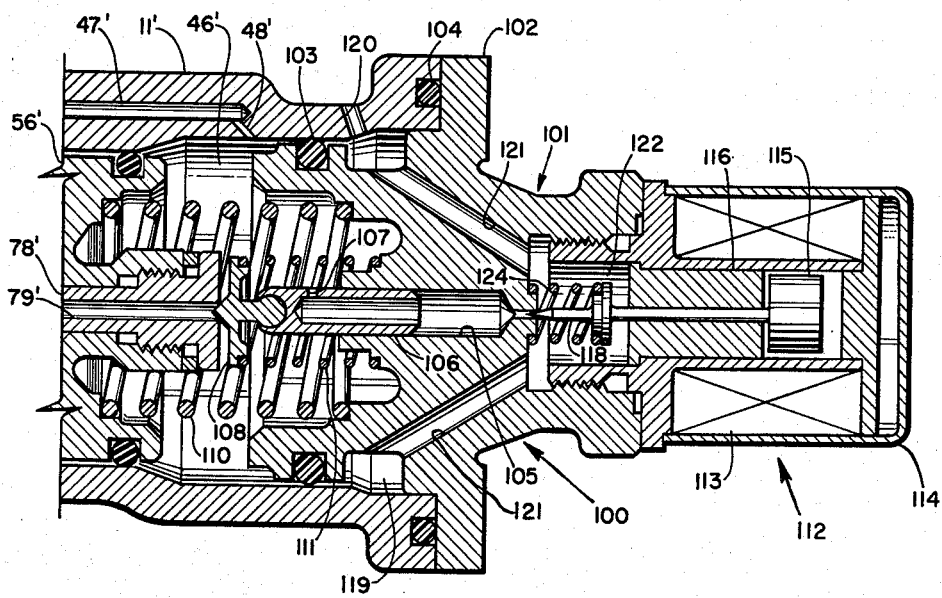
FIGURE 4 is a fragmentary, sectional view illustrating an alternate form of the present invention adapted for use as a combined pressure regulator and flow control valve unit.

The over-all conformability of the unit is best illustrated by the modified form of invention shown in FIGURE 4 where, in place of the rear cover and spring assembly shown in FIGURE 1, a shut-off unit assembly 100 is employed in combination with the valve assembly and sensing unit. Again, a regulator body 11' has a passage 47' extending from the inlet end for communication through a bleed opening 48' with clearance space 46'. Positioned across the end of the valve assembly is an end cap, a portion of which is indicated at 56' with a hollow stem 78' having a longitudinal passage 79' extending through the end cap for communication with the sensing unit. In order to urge the valve assembly to a closed position independently of the operation of the sensing unit, the shut-off valve 100 is positioned with valve body 101 connected through flanges 102 to the end of the regulator body 11'. The valve body projects forwardly into the clearance space and is mounted in sealed relation thereto by means of a suitable O-ring seal 103, and another O-ring seal 104 is positioned between the end of the regulator body and flange 102 of the valve shut-off body. A central passage 105 is formed along the axial center of the valve to accommodate a hollow slide member 106 provided with bleed opening 107. This slide is formed with valve head 108 positioned in swiveled relation in alignment with the longitudinal passage 79'. The passage extends through the stem 78' connected to the end cap 56'. A first outer spring 110 is interposed between the valve body 101 and end cap 56' all for the same purpose as defined in connection with spring 59 of FIGURE 1, and an inner spring 111 is interposed between the valve body and outer edge of the valve head 108 to urge the valve head 108 into abutting relation with the end of the stem 78' so as to close the passage 79' and normally prevent communication between the sensing unit and the clearance space.

Positioned at the end of the valve body 101 is a solenoid unit 112 having a solenoid coil 113, cover 114 and a plunger 115 mounted within guide 116 for axial movement therethrough. The plunger includes a needle valve 118 positioned at the axial center of the assembly and which upon energization of the solenoid 113 will be urged forwardly into engagement with the end of the valve body to close the passage 106 which communicates as described with the clearance space 46'. A chamber 119 has a bleed opening 120 extending through the body 11', and rearwardly converging passages 121 extend through the valve body into communication with chamber 122 formed between the solenoid unit 112 and valve body 101.

When the solenoid is energized, the plunger and needle valve 118 will move forwardly to close the passage 106, spring element 111 will hold the valve head 108 against the end of the valve stem 78', and spring element 110 will urge the entire valve assembly forwardly into closed position within the valve seat at the inlet end. However, upon deenergization of the solenoid, spring 124 will urge the valve 118 away from the passage 106, and similarly the valve head 108 will be retracted away from the stem under the force of fluid pressure in the clearance space acting thereagainst, since the pressure accumulation in passage 106 will be relieved into the chamber area 122 behind the valve body. Thus, in the valve-open position, the sensing unit will take over to control the pressure level in the outlet as described with reference to FIGURES 1–3.

From the foregoing, it will be evident that both forms of invention are characterized by their simplicity in design, ease of assembly, maintenance and servicing, interchangeability of parts and adaptability for use in different applications without modification of the unit. Thus, as desired, the unit may be employed either as a pressure regulator or a combination pressure regulator and shut-off valve, or as a pressure relief valve. Furthermore, it is extremely sensitive to outlet pressure variations while not being affected by inlet pressure variation, slight tolerance changes or temperature variations so as to provide maximum reliability and sensitivity under all conditions. Apart from the construction and design of individual elements employed in the assembly, it is believed that the particular way in which the elements cooperate together to bring about the above enumerated advantages is significant. Accordingly, it is to be understood that various modifications and changes may be made in the individual construction and composition of parts comprising the valve unit without departing from the scope of the present invention as defined by the appended claims.

What is claimed is:

1. In a fluid control valve, a body providing a valve chamber having an inlet and an outlet in normal communication with one another, and a valve seat between the inlet and outlet; a valve assembly disposed in the valve chamber entirely on one side of said valve seat and including an outlet pressure sensing unit therein, a valve head at one end of said assembly movable through the valve chamber into and out of engagement with said seat for controlling the flow of fluid between the inlet and outlet and a clearance space formed in the valve chamber at the opposite end of said valve assembly continuously communicating with the inlet fluid through a limited opening, said clearance space being defined by an outer flat cover and an inner movable end cap comprising part of said valve assembly, a spring between said cover and said end cap biasing them apart and said valve assembly presenting differential effective working areas at opposite ends thereof so that the resultant force of inlet pressure acting at opposite ends thereof will normally urge said valve head toward the closed position against said seat, said sensing unit including a sensing chamber communicating with the outlet, a cylindrical support tube at one end of said sensing chamber having an external shoulder, a base and openings in its wall, a support element at the other end of said sensing chamber having an internal shoulder, a positioning spring mounted between said shoulders biasing said support tube against said end cap, an end plate inside said spring near said other end comprising part of a flexible joint, a bellows member mounted inside said spring between said end plate and said base, a valve stem extending internally from said end cap inside said cylindrical support tube having a longitudinal duct therein communicating with said clearance space, and lateral ducts communicating said longitudinal duct with the exterior of said valve stem, a cylindrical valve sleeve mounted externally of said valve stem having openings in its wall for valving with said lateral ducts to form a variable clearance valve passageway from said clearance area to said sensing chamber, and biasing means between said sleeve and said end cap biasing said sleeve in the direction of said base.

2. The fluid control valve of claim 1 including a calibrating means incorporating said positioning spring, said calibrating means extending through said valve assembly for engagement with said sensing unit to regulate the initial disposition of said sensing unit necessary for a selected constant pressure at the outlet, said calibrating means including a temperature compensating element which is expansible and contractible to oppose expansion and contraction of said positioning spring in response to temperature variations.

3. A pressure control valve comprising a hollow cylindrical body forming a valve chamber having an axial fluid flow inlet at one end and an outlet adjacent the one end in normal communication with said inlet, and a tubular valve seat in coaxially aligned relation with said inlet; a valve assembly slidable in said valve chamber including a sensing unit therein and a valve head at one end coaxially aligned with said seat, said valve assembly being located entirely on one side of said valve seat, and an inlet pressure conduit in said body including a bleed opening in communication between said inlet and a clearance space in the valve chamber at the opposite end of the valve assembly and providing continuous communication therebetween, said valve assembly presenting a differential effective working area to the clearance space and said inlet whereby the resultant force acting at opposite ends of said valve will normally urge it toward the closed position against said seat, said sensing unit including a sensing chamber communicating with said outlet, valve control means in said sensing chamber responsive to outlet pressure to regulate the flow area of a variable flow opening in communication between said sensing chamber and the clearance space, manually adjustable calibrating means for said valve control means to control the size of the variable flow opening in relation to the bleed opening to establish a selected outlet pressure, the variable flow opening having a flow area in relation to the bleed opening so that decreases in outlet pressure below the selected pressure will increase the flow opening to decrease the pressure in the clearance space for increasing inlet flow and an increase in outlet pressure above the given pressure will reduce the flow opening to increase the pressure in the clearance space to decrease inlet flow, and a shut-off valve unit closing the end of the valve chamber opposite the inlet including a valve member movable through the clearance space to interrupt communication between the flow opening and clearance space whereby the resultant force of fluid acting at opposite ends of the valve assembly will urge the valve head into closed relation with the valve seat.

4. In a control valve, a hollow cylindrical body forming a valve chamber with an inlet and outlet in normal communication with one another at one end of the valve chamber, and a valve seat between said inlet and outlet; a valve assembly slidably disposed in said valve chamber entirely on one side of said valve seat, said valve assembly including an outlet pressure sensing unit therein and a valve head at one end coaxially aligned with said seat for controlling the flow of fluid between the inlet and outlet, an inlet pressure conduit including a bleed opening extending between said inlet and a clearance space in the valve chamber at the end of said valve assembly opposite said valve head, and providing continuous communication therebetween, said valve assembly presenting a differential effective working area to the clearance space and said inlet whereby the inlet pressure acting on opposite sides of said valve will normally urge it toward the closed position against said seat, and said sensing unit including a sensing chamber communicating with the outlet, valve control means in said chamber responsive to outlet pressure to regulate the flow area of the variable flow opening in communication between the clearance space and said sensing chamber, a shut-off valve unit in the clearance space adjacent the one end of said valve assembly including valve means movable through the clearance space to interrupt communication between the flow opening and clearance space; and a calibrating means for said valve control means to control the size of the variable flow opening necessary for establishing a given constant outlet pressure.

5. A fluid pressure control valve comprising a hollow cylindrical body forming a valve chamber with an axial fluid supply inlet including a tubular valve seat disposed therein, a transverse outlet communicating with the valve chamber, a poppet valve assembly slidably disposed in the valve chamber in sealed relation thereto, said valve assembly having a valve head cooperating with said valve seat to control the pressure of fluid flowing from the inlet to the outlet and a hollow piston connected to said valve head and located on the same side of said valve seat as said valve head, said piston being dimensioned in relation to the valve chamber to form a clearance space between the end of the piston and the adjacent end of the valve chamber which is opposite the inlet, an inlet pressure conduit in the body including a bleed opening communicating between the inlet and the clearance space, said end of said piston having an effective area greater than that across the valve head, the inlet pressure in the clearance space normally urging the valve head toward the closed position against the valve seat; a pressure sensing unit housed in said valve piston to maintain a constant pressure condition at the outlet end of said regulator, said pressure sensing unit including a sensing chamber, and outlet pressure sensing means including flow control means responsive to outlet pressure to control the flow area through an opening in the end of said piston communicating between the sensing chamber and clearance space whereby to effect variations in pressure in the clearance space to oppose changes in outlet pressure from a selected constant pressure, said outlet pressure sensing means including an evacuated bellows and a spring in outer spaced concentric relation to said bellows, said spring and bellows being expansible and contractible in response to decreases and increases, respectively, in outlet pressure, a slide supporting one end of said spring and being movable under expansion and contracting of said spring and bellows to control the flow area through the opening, and calibrating means in the body and extending through said valve piston for engagement with said outlet pressure sensing means to regulate the initial disposition of said outlet pressure sensing means so as to provide for a selected constant pressure at the outlet, said calibrating means being defined by a slidable support element for the other end of said spring including an outer temperature compensating element affixed to the inner surface of the valve piston, manual adjusting means engageable with said slidable support element and projecting through said valve piston and body whereby to simultaneously effect tensioning of said spring in relation to the evacuated bellows and to correspondingly effect movement of the valve head in relation to the valve seat in order to establish equilibrium between the bellows and the valve for a selected constant pressure condition at the outlet, and said temperature compensating element being of a composition and disposition in relation to the composition and disposition of said spring to resist dimensional changes of said spring on account of changes in temperature of the fluid.

References Cited by the Examiner

UNITED STATES PATENTS

| | | | |
|---|---|---|---|
| 737,682 | 9/03 | Waring | 137—492 |
| 824,681 | 6/06 | Ashley | 137—490 |
| 1,475,837 | 11/23 | Kent | 137—625.3 XR |
| 2,220,368 | 11/40 | Heidbrink | 137—80 XR |
| 2,774,373 | 12/56 | Fievet | 137—490 |
| 2,842,146 | 7/58 | Schuster | 137—495 |
| 3,011,516 | 12/61 | Au Werter | 137—489 |

FOREIGN PATENTS 645,056  5/37  Germany.

MARTIN P. SCHWADRON, *Acting Primary Examiner.*
M. CARY NELSON, *Examiner.*